Patented Sept. 8, 1931

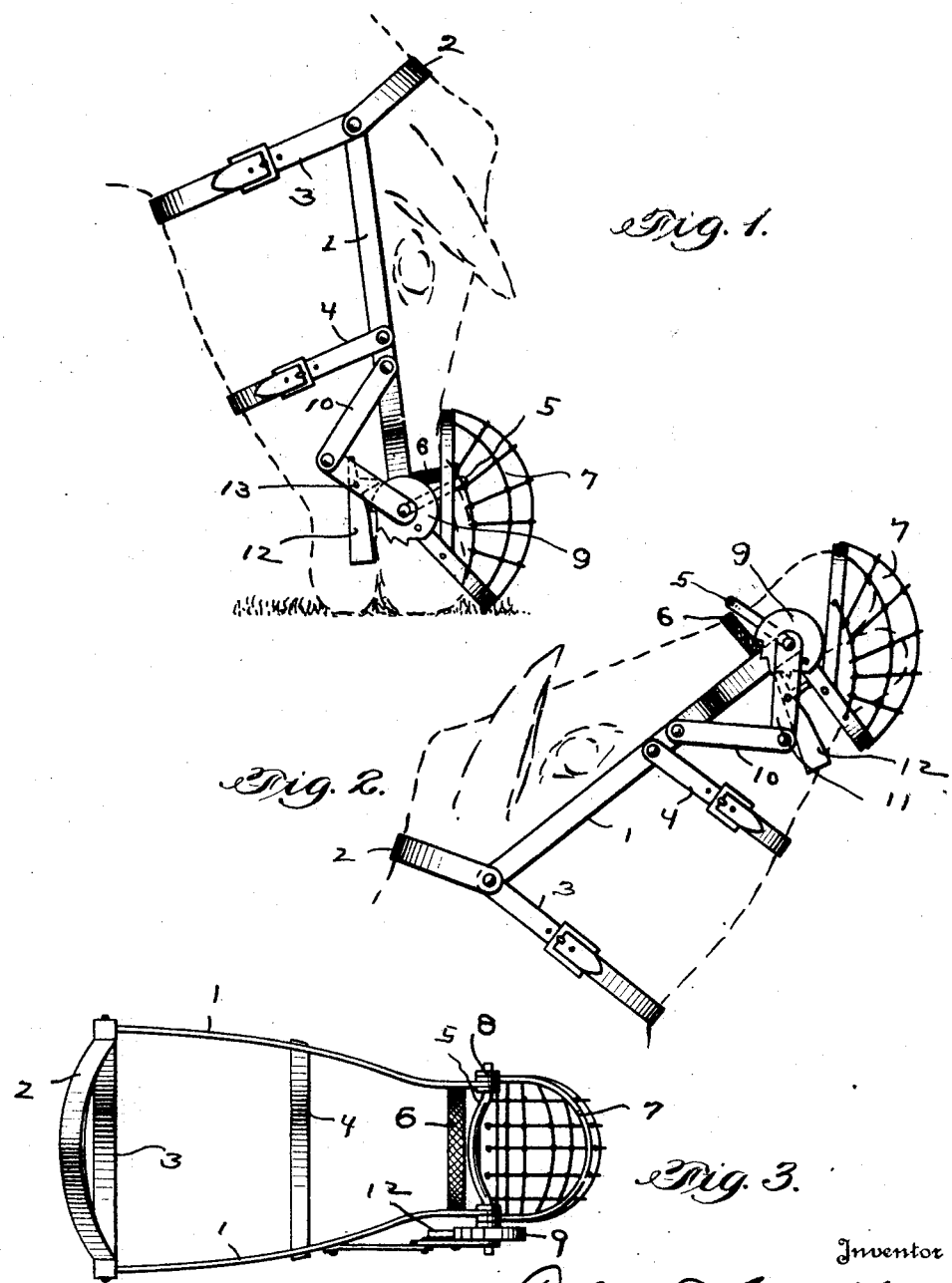

1,822,610

UNITED STATES PATENT OFFICE

ROBERT F. CAMPBELL, OF STUART, FLORIDA

CATTLE MUZZLE

Application filed May 15, 1929. Serial No. 363,263.

It is desirable to raise cattle in orchards in order that they may eat the grass that is sapping the trees, but it is found that the cattle frequently eat the leaves and fruit from the trees, and this is especially true in citrous fruit groves, as the cows are very fond of the leaves and the young fruit on citrous fruit trees.

The object of my invention is to provide a muzzle which permits the cattle to freely graze, but at the same time prevents them from eating the fruit and the leaves from the trees.

Muzzles for cows have been on the market in which the hood by gravity swings across the mouth of the cow, but such animals are very wise and unless the hood is locked they will put their heads into a tree, break the hood open, and eat as freely of the leaves and fruit as if they were unmuzzled, all of which is impossible when my muzzle is used.

In the drawings:

Figure 1 is a side elevation of my improved muzzle in position on the head of the cow with the head in lowered and grazing position.

Figure 2 is a similar view with the head of the cow in elevated position.

Figure 3 is a top plan view of my improved muzzle.

Reference numeral 1 designates the frame of my improved muzzle the same comprising side frame bars which are connected at their rear ends by a head strap 2 and are adapted to be united by a throat latch 3, and an additional latch 4, and said frame bars being connected at their front ends by an arched bridge bar 5. This metallic bridge bar 5 normally lies out of contact with the nose of the animal, the frame being supported at the front upon the head of the animal by a pliable nose band 6 which preferably is made of woven textile material.

7 is a hood pivotally mounted at 8 on the ends of the bar 5 which project through the frame bars 1, said hood having keyed to it at one side of the frame a ratchet 9. The bridge bar 5 serves to rigidly connect the frame bars at their forward ends, and the end portions of said bridge bar, which project through openings in the frame bars 1 and laterally beyond the same, provide pivotal supports or trunnions for the hood 7, on which the latter swings. The bridge bar may be fixed to the frame members 1 against rotation in any preferred manner, as by providing it with non-circular portions engaging non-circular openings in the frame bars. The ratchet 9 loosely engages one of the end portions or trunnions of the bar 5 and, as stated, is keyed to the adjacent side of the hood or otherwise suitably fastened thereto to swing therewith. 10 and 11 are arms secured at right angles to each other and to the frame 1, there being no relative movement between these arms. A weighted pawl 12 is pivotally mounted at 13 to the arm 11 in such position that it may engage with the ratchet 9 of the hood. Normally the bar 5 is out of contact with the nose of the animal or but lightly touches the animal, the forward portion of the muzzle being supported on the nose of the animal by the soft fabric nose band 6, but in the event that this band 6 is broken the bar 5 will drop down into engagement with the nose and support the forward portion of the muzzle in position thereon.

As shown in Figure 1, when the head of the animal wearing my improved muzzle is in lowered or grazing position the hood is free to swing upward on its trunnions, thus permitting the animal to freely graze. When the head of the animal is in elevated position shown in Figure 2 however, the hood will swing downward, thus bringing the ratchet teeth into position to be engaged by the weighted pawl 12, and the latter will swing by gravity so as to bring its tooth into engagement with the ratchet 9 and holds the hood in the position in which it is swung by gravity across the mouth of the animal. It is impossible when in this elevated position for the animal to release the pawl and hood by putting its head into a tree and dragging the muzzle to open position, therefore the animal cannot eat the fruit and leaves from the trees.

I am aware that changes may be made in the details of construction shown without departing from the scope of the appended claims.

What I claim is:

1. In a cow muzzle a head frame, fastening means for said frame, a hood pivotally mounted on said frame and free to swing when the head of the animal wearing the muzzle is in lowered position, a ratchet keyed to said hood, and a pawl pivotally mounted on said frame adapted to engage said ratchet and hold the hood against movement when the head of the animal wearing the hood is in elevated position.

2. In a cow muzzle, a head frame, fastening means for said frame, a hood pivotally mounted on said frame and free to swing when the head of the animal wearing the muzzle is in lowered position, a ratchet keyed to said hood, and a counterbalanced pawl pivotally mounted on said frame adapted to engage said ratchet and hold the hood against movement when the head of the animal wearing the hood is in elevated position.

3. In a cow muzzle a frame, means for fastening the frame on the head of the cow, a pliable nose piece on the frame, means for fastening the frame in operative position, a hood pivotally mounted on said frame, a ratchet keyed to said hood, and a weighted pawl pivotally mounted on the frame and adapted to engage the said ratchet and hold the hood against movement when the head of the animal wearing the hood is in elevated position.

In testimony whereof I affix my signature.

ROBERT F. CAMPBELL.